(12) United States Patent
Feng

(10) Patent No.: US 8,714,903 B2
(45) Date of Patent: May 6, 2014

(54) ROBOT

(75) Inventor: Yong Feng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 696 days.

(21) Appl. No.: 12/980,373

(22) Filed: Dec. 29, 2010

(65) Prior Publication Data

US 2011/0291433 A1    Dec. 1, 2011

(30) Foreign Application Priority Data

May 28, 2010   (CN) .......................... 2010 1 0186141

(51) Int. Cl.
*B66C 1/00*   (2006.01)
*B66C 3/00*   (2006.01)

(52) U.S. Cl.
USPC ........ 414/735; 414/729; 414/917; 74/490.01; 74/490.03; 74/490.05; 74/490.07

(58) Field of Classification Search
USPC ............... 74/490.01, 490.03, 490.05, 490.06, 74/490.07; 901/15, 27–29; 414/735, 729, 414/917; 267/69–74; 318/567, 568.21; 294/183, 64.2, 189, 65
See application file for complete search history.

(56) References Cited

U.S. PATENT DOCUMENTS

| | | | | |
|---|---|---|---|---|
| 4,976,582 A | * | 12/1990 | Clavel | 414/729 |
| 5,715,729 A | * | 2/1998 | Toyama et al. | 74/490.03 |
| 6,516,681 B1 | * | 2/2003 | Pierrot et al. | 74/490.01 |
| 6,543,987 B2 | * | 4/2003 | Ehrat | 414/735 |
| 8,134,324 B2 | * | 3/2012 | Nishida et al. | 318/568.21 |
| 2006/0182602 A1 | * | 8/2006 | Schuler et al. | 414/735 |
| 2008/0141813 A1 | | 6/2008 | Ehrat | |

FOREIGN PATENT DOCUMENTS

CN    2493371 Y    5/2002

* cited by examiner

*Primary Examiner* — Stephen Vu
(74) *Attorney, Agent, or Firm* — Novak Druce Connolly Bove + Quigg LLP

(57) ABSTRACT

A robot includes a base, a movable platform, a shaft rotatably connecting the movable platform and the base, three kinematic chains rotatably connecting the movable platform and the base, an end effector defining an air orifice, and a rotary member. The rotary member is rotatably connected to the movable platform, and two opposite ends of the rotary member are connected to the shaft and the end effector, respectively. The movable platform defines an air hole, and the rotary member defines an airflow passage communicating between the air hole and the air orifice.

12 Claims, 4 Drawing Sheets

ROBOT

BACKGROUND

1. Technical Field

The present disclosure relates to robotic technologies, and more particularly to a robot having an end effector.

2. Description of Related Art

Parallel robots have advantages of stability, load-bearability, favorable weight to load ratio, improved dynamic characteristics, and others, such that they may be used in many fields. Delta robots are typically parallel robots with three degrees of freedom (3DoF), and with simpler, more compact structure and favorable dynamic characteristics.

A typical delta robot includes a base, a movable platform, a shaft and three kinematic chains. The shaft and the kinematic chains connect the movable platform and the base. Opposite ends of the shaft are pivoted on the base and the movable platform, respectively. An end effector, such as a suction tip, is mounted at a distal end of the shaft and rotatable relative to the movable platform, so that the end effector can realize three degrees of freedom (two degrees of movement and one degree of rotation).

During use, a flexible tube is provided to interconnect the suction tip and a vacuum facility to pick up a workpiece. When the suction tip rotates with the shaft relative to the movable platform, the flexible tube is prone to coil around the movable platform, and as a result, may suffer damages, with the rotation accuracy of the movable platform reduced accordingly.

Therefore, there is room for improvement within the art.

BRIEF DESCRIPTION OF THE DRAWINGS

The components in the drawings are not necessarily drawn to scale, the emphasis instead being positioned upon clearly illustrating the principles of the present disclosure. Moreover, in the drawings, like reference numerals designate corresponding parts throughout the views.

DETAILED DESCRIPTION

Figure 1:
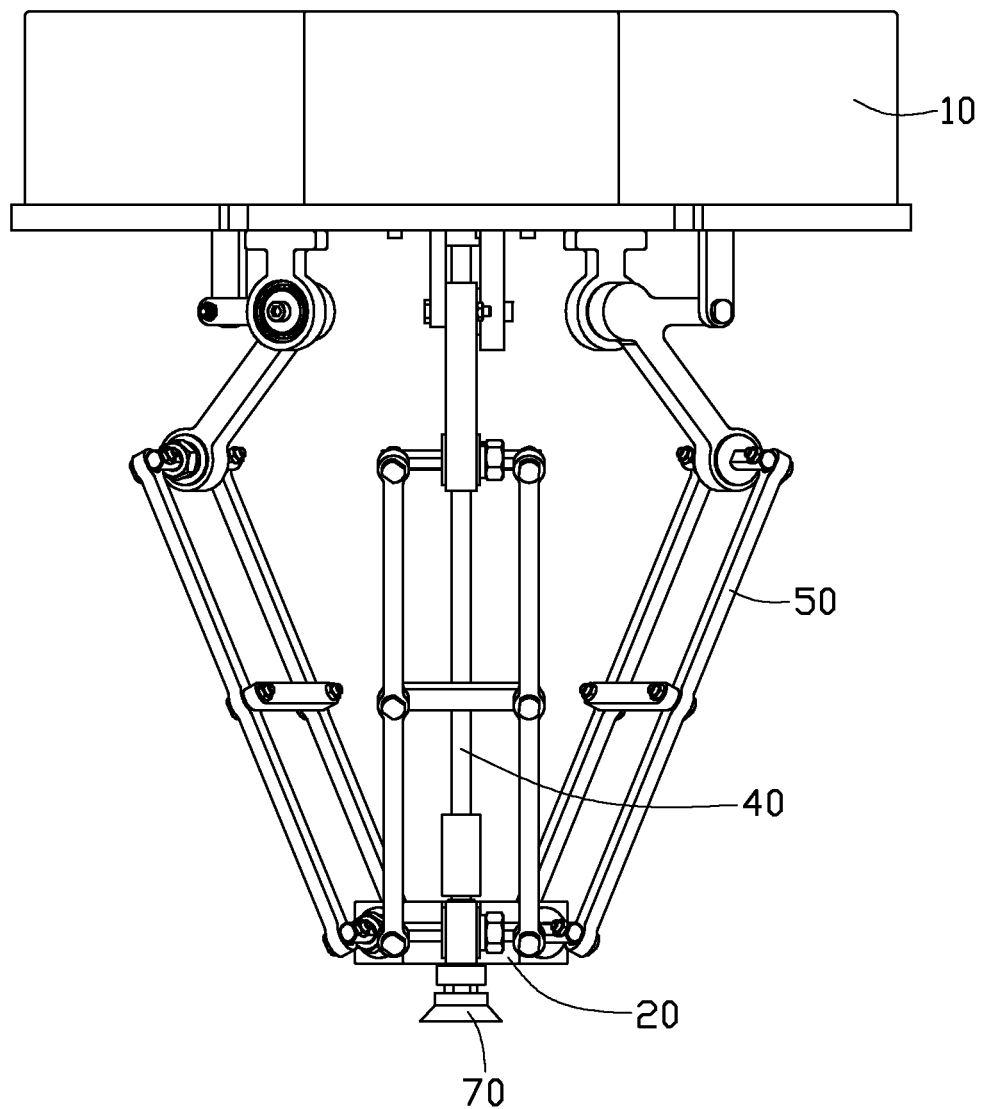
FIG. 1 is a side, assembled view of one embodiment of a robot, the robot including a base, a movable platform, and an end effector.

Referring to FIG. 1, an embodiment of a robot 100 is a delta robot, including a base 10, a movable platform 20, a shaft 40, three kinematic chains 50 and an end effector 70. The shaft 40 and the kinematic chains 50 rotatably connect the movable platform 20 and the base 10. The end effector 70 is mounted at a distal end of the shaft 40, and rotatable relative to the movable platform 20.

Figure 2:
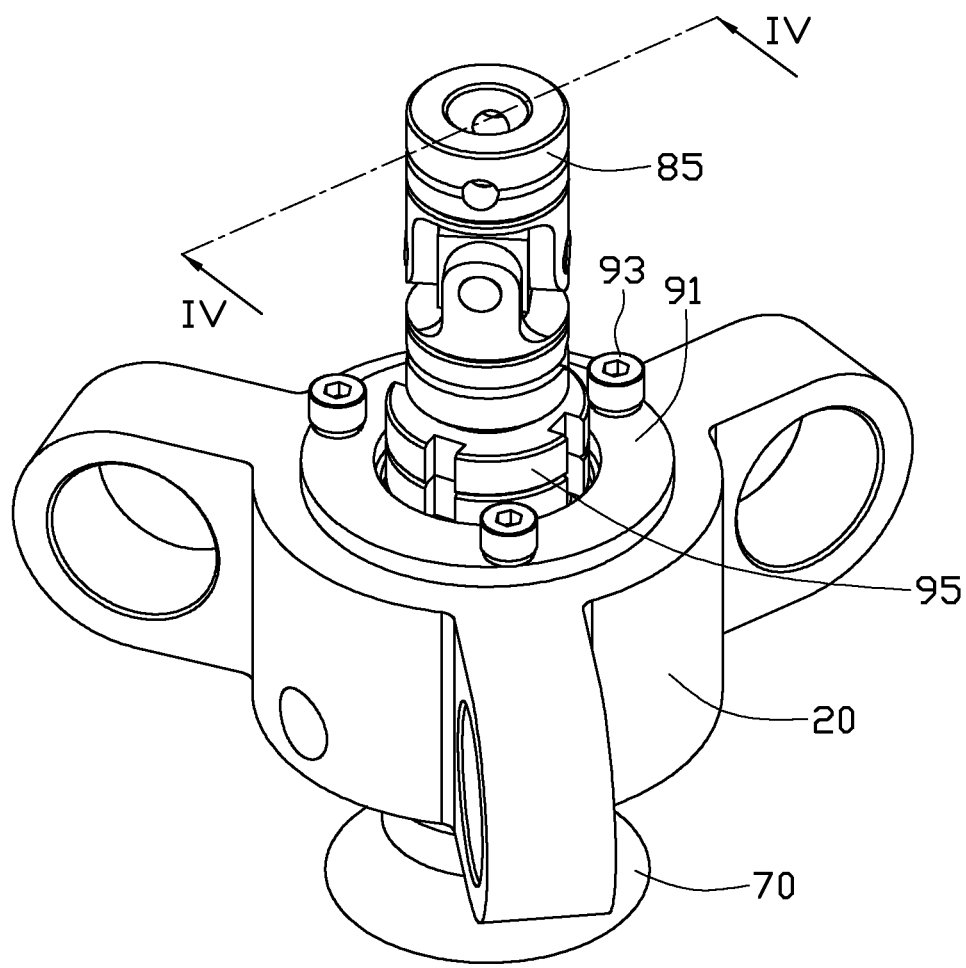
FIG. 2 is an isometric, assembled view of the movable platform and the end effector of FIG. 1.
Figure 3:
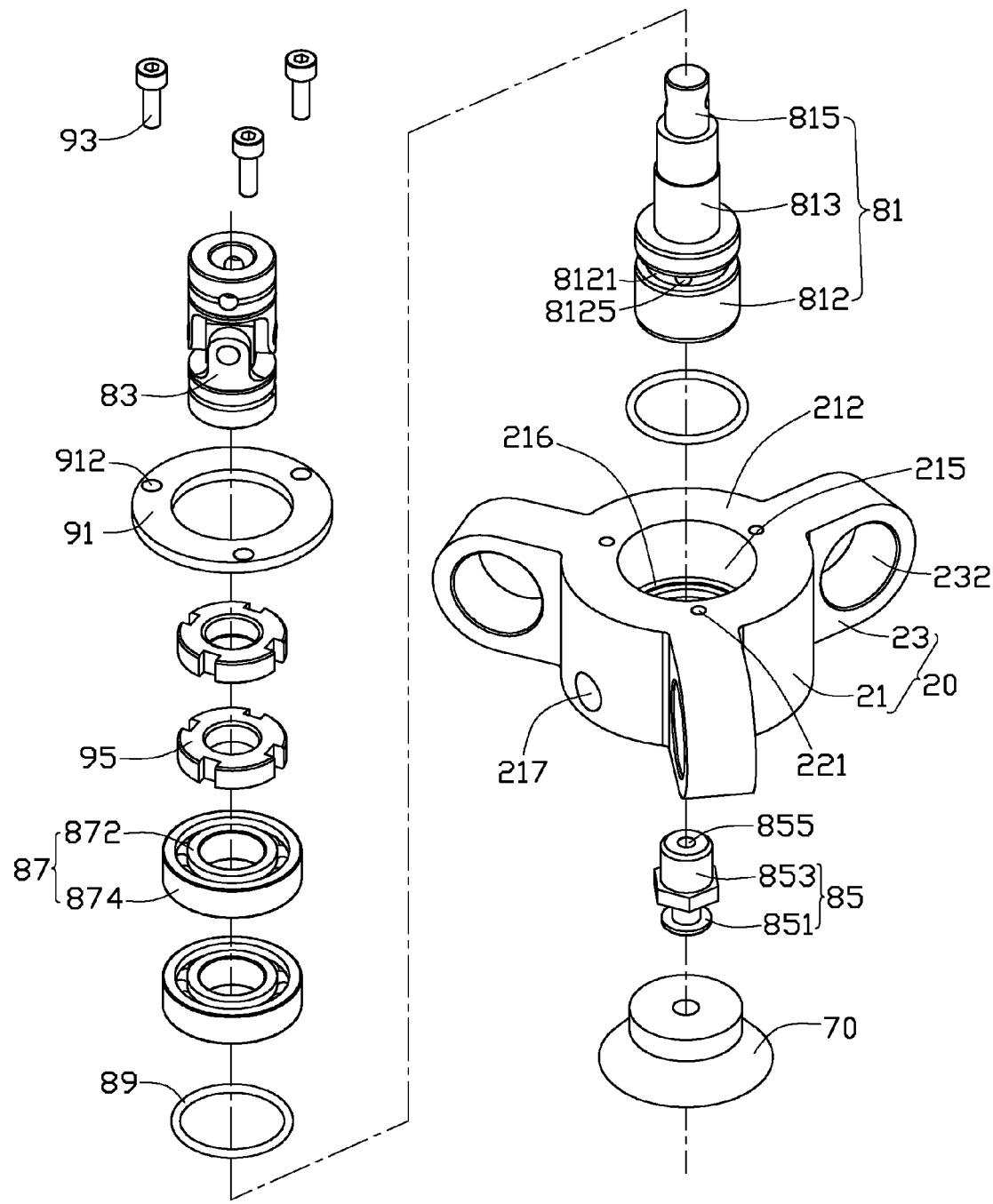
FIG. 3 is an exploded, isometric view of the movable platform and the end effector of FIG. 2.

Referring to FIG. 2 and FIG. 3, the robot 100 further includes a rotary member 81, a joint 83 connecting the rotary member 81 and the shaft 40, a connecting member 85 connecting the end effector 70 and the rotary member 81, a pair of bearings 87, a pair of seals 89, a fixing member 91, three fasteners 93, and a pair of washers 95.

Figure 4:
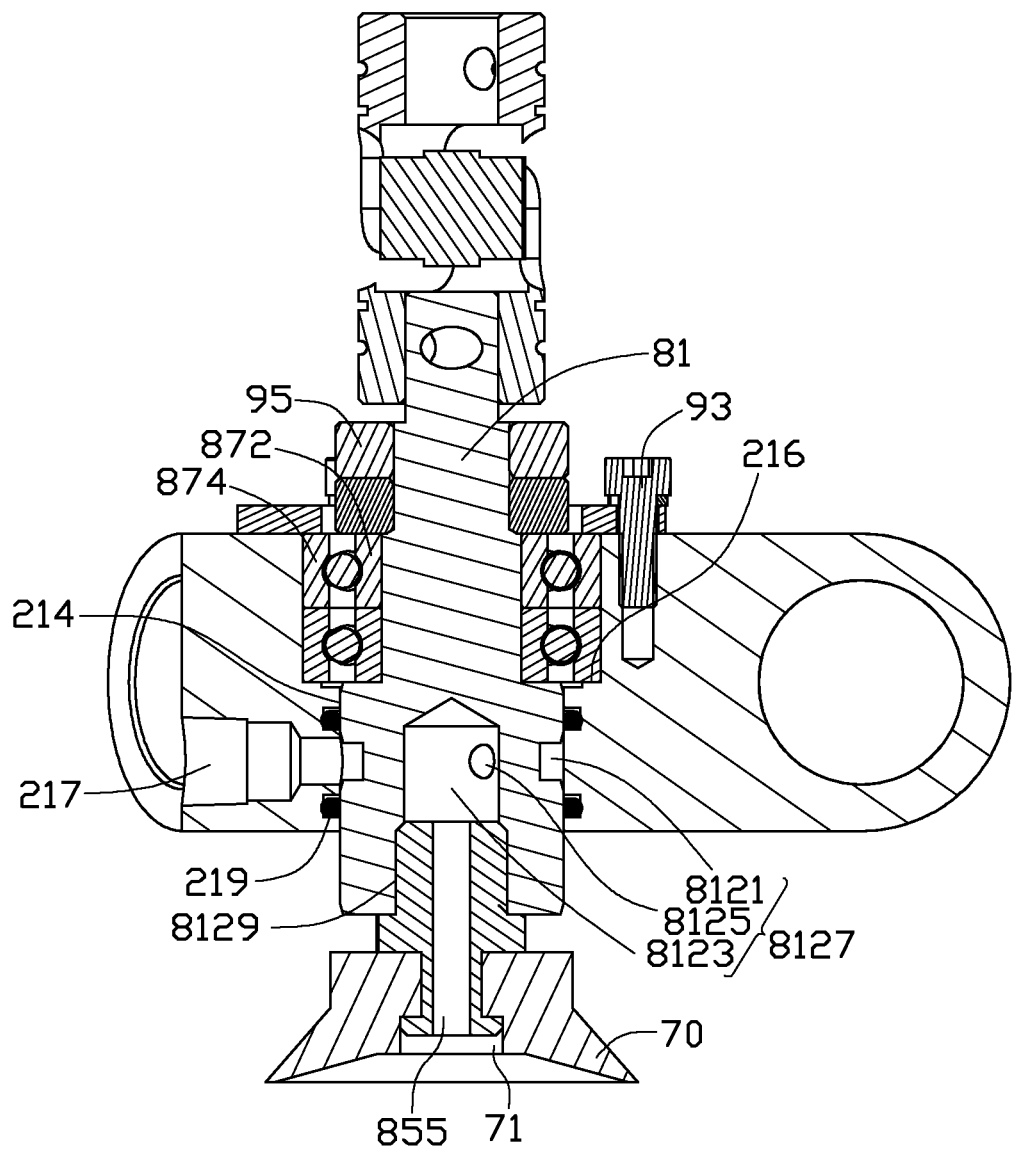
FIG. 4 a cross section of the movable platform and the end effector of FIG. 2, taken along the line IV-IV.

Referring also to FIG. 4, the movable platform 20 includes a main body 21 and three connecting ears 23 uniformly extending out from an outer side surface of the main body 21.

The main body 21 is substantially cylindrical, and includes a first end surface 212 and a second end surface (not labeled) opposite to the first end surface 212. The main body 21 defines a first receiving portion 214 and a second receiving portion 215 communicating with the first receiving portion 214. The main body 21, the first receiving portion 214, and the second receiving portion 215 are aligned on the same axis. The first receiving portion 214 and the second receiving portion 215 are a plurality of holes respectively extending through the second end surface and the first end surface 212. The first receiving portion 214 and the second receiving portion 215 are of different diameters, therefore a connecting surface 216 is defined at a joint of the first receiving portion 214 and the second receiving portion 215. The main body 21 defines an air hole 217 communicating with the first receiving portion 214 at an outer surface of the main body 21 and extending through an inner surface of the first receiving portion 214. The first receiving portion 214 further defines a pair of receiving slots 219 depressed from the inner surface of the first receiving portion 214. The pair of receiving slots 219 is substantially annular to receive the pair of seals 89, and coaxial with the main body 21. The air hole 217 is located between the pair of receiving slots 219. The main body 21 further defines three mounting holes 221 at the end surface 212. Each connecting ear 23 defines a connecting hole 232 having an axis substantially perpendicular to that of the main body 21 to rotatably connect one kinematic chain 50 to the movable platform 20.

In the illustrated embodiment, the end effector 70 is a suction tip defining an air orifice 71 (see FIG. 4). The end effector 70 is made of plastic.

The rotary member 81 is substantially a stepped shaft, and includes a first rotary portion 812, a second rotary portion 813 extending from an end of the first rotary portion 812, and a fixing portion 815 formed at an end of the second rotary portion 813 away from the first rotary portion 812. The first rotary portion 812 is substantially cylindrical, and defines a conveying slot 8121 at an outer surface of the first rotary portion 812. The conveying slot 8121 is substantially an annular slot extending around the outer surface of the first rotary portion 812. In the illustrated embodiment, the conveying slot 8121 is coaxial with the first rotary portion 812. The first rotary portion 812 defines a cavity 8123 at the center thereof, and a through hole 8125 communicating between the conveying slot 8121 and the cavity 8123. The conveying slot 8121, the cavity 8123, and the through hole 8125 cooperatively define an airflow passage 8127. The first rotary portion 812 further defines a receiving groove 8129 (see FIG. 4) depressed from an end of the first rotary portion 812 away from the second rotary portion 813 for receiving the connecting member 85. The receiving groove 8129 communicates with the cavity 8123. The second rotary portion 813 is substantially cylindrical. The second rotary portion 813 is coaxial with the first rotary portion 812, and smaller than the first rotary portion 812. The fixing portion 815 is configured to fix the rotary member 81 to the joint 83.

The joint 83 is configured to movably connect the shaft 40 and the rotary member 81. In the illustrated embodiment, the joint 83 is a hook joint.

The connecting member 85 includes a first connecting portion 851, and a second connecting portion 853. The first connecting portion 851 is configured to fix the end effector 70. The second connecting portion 853 is formed at an end of the first connecting portion 851. The second connecting portion 853 is substantially cylindrical, and corresponds in shape to the receiving groove 8129, such that the second connecting portion 853 may be securely received in the receiving groove 8129. The connecting member 85 further defines a spiracle 855 coaxial with the second connecting portion 853. The spiracle 855 extends through the first connecting portion 851 and the second connecting portion 853.

Each bearing 87 includes an inner ring 872, and an outer ring 874 rotatably sleeved on the inner ring 872. The bearings 87 are configured to connect the rotary member 81 and the movable platform 20 to reduce the frictional drag.

Each seal 89 is substantially annular, and made of rubber. Each seal 89 may be received in one receiving slot 219, and protrudes out from the inner surface defining the first receiving portion 214.

The fixing member 91 is substantially annular, and defines three mounting holes 912 corresponding to the three mounting holes 221 defined at the main body 21.

The fasteners 93 are configured to fix the fixing member 91 to the movable platform 20. In the illustrated embodiment, the fasteners 93 are a plurality of screws.

The washers 95 may sleeve on the second rotary portion 813 of the rotary member 81, and are configured to fix the inner ring 872 of the bearing 87.

During assembly of the robot 100, each seal 89 is received in one receiving slot 219. The first rotary portion 812 of the rotary member 81 is received in the first receiving portion 214 of the movable platform 20, the second rotary portion 813 is received in the second receiving portion 215, an end of the second rotary portion 813 away from the first rotary portion 812 passes through the second receiving portion 215 and protrudes out from the end surface 212, and the air hole 217 corresponds to the conveying slot 8121. An inner surface of each seal 89 resists the first rotary portion 812 of the rotary member 81. The pair of bearings 87 is sleeved on the second rotary portion 813 successively, and received in the second receiving portion 215. The fixing member 91 is sleeved on the second rotary portion 813, and resists the outer ring 874 of the bearing 87 away from the first rotary portion 812. The fixing member 91 is fixed to the movable platform 20 by the three fasteners 93 engaging with the three mounting holes 221 and the three mounting holes 912. The pair of washers 95 is sleeved on and fixed to the second rotary portion 813, and resists the inner ring 872 of the bearing 87 away from the first rotary portion 812. The fixing portion 815 of the rotary member 81 is pivotally connected to an end of the shaft 40 away from the base 10 by the joint 83. An end of each kinematic chain 50 away from the base 10 is pivotally connected to one connecting ear 23. The second connecting portion 853 is securely received in the receiving groove 8129, the end effector 70 is fixed to the first connecting portion 851 of the connecting member 85, and the air orifice 71 communicates with the spiracle 855. The end effector 70 may be connected to a vacuum facility (not shown) by a tube (not shown) through the air hole 217.

In use, the vacuum facility impels the air contained in the end effector 70 through the air orifice 71, the spiracle 855, and the airflow passage 8127, and finally exhausts the airflow through the air hole 217. When the shaft 40 rotates, the rotary member 81 rotates with the shaft 40, and the end effector 70 rotates to a predetermined position, the conveying slot 8121 maintaining communication with the air hole 217, and the airflow passage 8127 communicates between the air hole 217 and the air orifice 71. While the shaft 40 rotates, the movable platform 20 does not rotate with the shaft 20 but remains still, as does the flexible tube connected to the movable platform 20 also remains still relative to the movable platform 20 rather than winding around the movable platform 20, such that the accuracy of the robot 100 is insured and the flexible tube is protected from abrasion.

Alternatively, the fixing member 91 and the three fasteners 93 may be omitted, as long as the outer ring 874 is fixed to the second receiving portion 215 by welding or any other method. The washers 95 may further be omitted. One or more bearings 87, in addition to just two bearings 87, can be sleeved on the second rotary portion 813. The connecting member 85 can be omitted, whereby the end effector 70 is fixed to an end of the first rotary portion 812 away from the second rotary portion 813 directly. The receiving slots 219 are not limited to be defined only in the first receiving portion 214, but are alternatively applicable in an outer surface of the first rotary portion 812. The end effector 70 is not limited to be a suction tip, but can be an air-powered gripper.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot, comprising:
a base;
a movable platform defining a first receiving portion;
a shaft, the shaft rotatably connecting the movable platform and the base;
three kinematic chains, the kinematic chains rotatably connecting the movable platform and the base;
an end effector, the end effector defining an air orifice; and
a rotary member, wherein the rotary member is rotatably connected to the movable platform, two opposite ends of the rotary member are connected to the shaft and the end effector, respectively, the movable platform defines an air hole, the rotary member comprises a first rotary portion received in the first receiving portion, the first rotary portion defines an airflow passage communicating between the air hole and the air orifice, the airflow passage comprises a conveying slot defined in an outer surface of the first rotary portion, a cavity defined in the center of the first rotary portion, and a through hole communicating between the cavity and the conveying slot, the conveying slot is substantially an annular slot extending around the outer surface of the first rotary portion, the air hole corresponds to the conveying slot, the end effector is fixed to the first rotary portion, and the air orifice communicates with the cavity.

2. The robot of claim 1, further comprising a pair of seals, wherein the first rotary portion further defines two receiving slots, each receiving slot is substantially annular and depressed from the outer surface of the first rotary portion, each seal is received in one receiving slot and resists an inner surface of the first receiving portion, and the conveying slot is located between the two receiving slots.

3. The robot of claim 1, further comprising a pair of seals, wherein the movable platform further defines two receiving slots, each receiving slot is substantially annular and depressed from an inner surface of the first receiving portion, each seal is received in one receiving slot and resists the outer surface of the first rotary portion, and the air hole is located between the two receiving slots.

4. The robot of claim 1, further comprising a connecting member defining a spiracle, wherein the first rotary portion further defines a receiving groove depressed from an end of the first rotary portion, and the receiving groove communicates with the cavity, an end of the connecting member is securely received in the receiving groove, the spiracle communicates with the cavity, the end effector is fixed to another end of the connecting member, and the spiracle communicates with the air orifice.

5. The robot of claim 1, further comprising at least one bearing rotatably connecting the rotary member and the movable platform.

6. The robot of claim 5, wherein the rotary member further comprises a second rotary portion extending from an end of the first rotary portion away from the end effector, the movable platform further defines a second receiving portion communicating with the first receiving portion, the bearing is sleeved on the second rotary portion, and the second rotary portion and the bearing are at least partly received in the second receiving portion.

7. The robot of claim 6, wherein the bearing comprises an inner ring and an outer ring, the outer ring rotatably sleeved on the inner ring, the inner ring is fixed to the second rotary portion, and the outer ring is fixed to the second receiving portion.

8. The robot of claim 7, further comprising a fixing member fixed to the movable platform, wherein a connecting surface is defined at a joint of the first receiving portion and the second receiving portion, and two opposite ends of the outer ring abut the fixing member and the connecting surface.

9. The robot of claim 7, further comprising at least one washer, wherein the washer is fixed to the second rotary portion and abut the inner ring.

10. The robot of claim 1, further comprising a joint movably connecting the shaft and the rotary member, wherein the joint is a hook joint.

11. The robot of claim 1, wherein the end effector is a suction tip.

12. The robot of claim 1, wherein the end effector is an air-powered gripper.

\* \* \* \* \*